United States Patent
Hiramoto

(10) Patent No.: US 11,853,597 B2
(45) Date of Patent: Dec. 26, 2023

(54) MEMORY MANAGEMENT UNIT, METHOD FOR MEMORY MANAGEMENT, AND INFORMATION PROCESSING APPARATUS

(71) Applicant: FUJITSU LIMITED, Kawasaki (JP)

(72) Inventor: Shinya Hiramoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 17/878,091

(22) Filed: Aug. 1, 2022

(65) Prior Publication Data

US 2023/0153021 A1 May 18, 2023

(30) Foreign Application Priority Data

Nov. 12, 2021 (JP) ................................ 2021-184935

(51) Int. Cl.
*G06F 3/06* (2006.01)
(52) U.S. Cl.
CPC ............ *G06F 3/0655* (2013.01); *G06F 3/061* (2013.01); *G06F 3/0673* (2013.01)
(58) Field of Classification Search
CPC ...... G06F 3/0655; G06F 3/061; G06F 3/0673; G06F 12/10; G06F 12/0862
See application file for complete search history.

(56) References Cited

U.S. PATENT DOCUMENTS

| | | | |
|---|---|---|---|
| 2011/0010521 A1* | 1/2011 | Wang | G06F 12/1027 711/E12.078 |
| 2014/0095784 A1* | 4/2014 | Tran | G06F 12/1027 711/E12.07 |
| 2019/0163641 A1* | 5/2019 | Cooray | G06F 12/1027 |
| 2021/0109868 A1* | 4/2021 | Anderson | H03M 13/1575 |

OTHER PUBLICATIONS

Gokul B. Kandiraju et al., "Going the Distance for TLB Prefetching: An Application-driven Study", IEEE Computer Society, Proceedings of the 29th Annual International Symposium on Computer Architecture (ISCA'02), 2002 IEEE, pp. 195-206, DOI: 10.1109/ISCA.2002.1003578 (Total 12 pages).
Tien-Fu Chen et al., Effective Hardware-Based Data Prefetching for High-Performance Processors. IEEE Transactions on Computers, 1995 IEEE, vol. 44, No. 5, pp. 609-623, May 1995 (Total 15).

* cited by examiner

*Primary Examiner* — Baboucarr Faal
(74) *Attorney, Agent, or Firm* — Fujitsu Intellectual Pro

(57) ABSTRACT

A memory management unit includes a controller performing a process translating a requested virtual address to a physical address based on a first region storing first entries indicating the physical address matching a given bit range of the virtual address and a second region storing a second entry associating the bit range with the first entries. When a second entry matching the bit range of a first address is hit in the second region, the controller sets, in the hit second entry, an identification number of a first entry specified by the first address. When the same second entry regarding the first address and a second address is hit and when an identification number specified by the second address is larger than an identification number set in the second entry, the controller obtains, from a memory, information of first entries subsequent to first entries associated with the hit second entry.

17 Claims, 16 Drawing Sheets

FIG.8

EXAMPLE ADDRESS INFORMATION
OF RPT ENTRY — 241

| PC | TARGET ADDRESS | STRIDE | STATUS |

FIG.12 EXAMPLE OF STATUS TRANSITION IN STATUS FIELD OF TAG ENTRY

MEMORY MANAGEMENT UNIT, METHOD FOR MEMORY MANAGEMENT, AND INFORMATION PROCESSING APPARATUS

CROSS-REFERENCE TO RELATED APPLICATION

This application is based upon and claims the benefit of priority of the prior Japanese Patent application No. 2021-184935, filed on Nov. 12, 2021, the entire contents of which are incorporated herein by reference.

FIELD

The embodiment discussed herein is related to a memory management unit, a method for memory management, and an information processing apparatus.

BACKGROUND

A process, which operates on an OS of a computer, has an independent virtual address space and uses a virtual address to access a main memory. A processor of a computer includes a Memory Management Unit (MMU) that translates a virtual address to a physical address of the main memory, and a processor core that executes a process and accesses the main memory using the physical address translated by the MMU.

An Input/Output (IO) device, which makes an access to the main memory and which is exemplified by a network interface, includes an IOMMU that translates a virtual address serving as a destination for a packet to be input into a physical address. The IOMMU is the same in configuration and operation as the MMU of a processor. Hereinafter, not discriminating the MMU of a processor from the IOMMU of an IO device from each other, the MMU and the IOMMU are collectively referred to as an "MMU".

In order to achieve rapid translation of a virtual address to a physical address, the MMU has a storing region that stores information indicating the association relationship of the virtual address with the physical address. The storing region is exemplified by a Translation Lookaside Buffer (TLB). In the TLB, a physical address associated with a virtual address is set on the basis of a translation table obtained from the main memory.

When an entry associated with a virtual address obtained from a translation requester such as a process exists in the TLB (TLB hit), the MMU reads the physical address from the TLB, and responds to the translation requester with the read virtual address to skip the access to the main memory.

In contrast, when an entry associated with the virtual address does not exist in the TLB (TLB miss), the MMU obtains (fetches) information indicating the association relationship from the main memory, responds to the processor core with the association, and stores the association into the TLB.

A TLB prefetching scheme has been known as one of the schemes to suppress prolonging the translation processing time that the access to the main memory takes when a TLB miss. In the TLB prefetching scheme, the MMU predicts a virtual address that the process will access next, fetches information indicating the association relationship of the virtual address from the main memory in advance, and stores the fetched information into the TLB.

One of the known schemes to predict a virtual address that the process will access utilizes a Reference Prediction Table (RPT) containing an entry associated with a Program Counter (PC) of a Store/Load command.

In the scheme, each time the process executes a store/load command, the MMU stores, into the RPT, a virtual address of the access target of the command and a difference (stride) between the virtual address and a virtual address of the access target when the same command as the virtual address was executed previously, for example.

When a TLB miss occurs in a store/load command, the MMU predicts that a virtual address obtained by adding the stride of an entry associated with the PC and the virtual address of the store/load command to the virtual address of the command is a virtual address to be accessed next.

[Non-Patent Document 1] G. B. Kandiraju and A. Sivasubramaniam, "Going the distance for TLB prefetching: an application-driven study," Proceedings 29th Annual International Symposium on Computer Architecture, 2002, pp. 195-206, doi: 10.1109/ISCA.2002.1003578

[Non-Patent Document 2] T. Chen and J. Baer. Effective hardware based data prefetching for high-performance processors. IEEE Transactions on Computers, 44(5):609-623, May 1995

An RPT includes about several hundred entries (e.g., 512 entries), each of which reserves several dozen to hundred bits for bit width of a PC and an address in total.

If a processor executes multiple processes, the MMU uses information such as a process ID (Identifier) to specify the PC of a load/store command. In this case, the RPT has entries of the same number as the process number of processes and bits for information of a process ID and the like is attached to each entry.

As the above, in a scheme that prefetches information of a translation table to suppress prolonging the translation processing time that the MMU takes, a table such as the RPT is prepared separately from the TLB, which leads to increase in circuitry volume (physical volume) of the MMU. Consequently, there is a possibility of increasing a manufacturing cost and a circuitry scale of the MMU and also increasing consumption electricity, for example.

SUMMARY

According to an aspect of the embodiment, a memory management unit includes: a first storing region, a second storing region, and a controller. The first storing region may store one or more first entries indicating a physical address matching a first bit range of a virtual address. The second storing region may store a second entry associating the first bit range of the virtual address with the one or more first entries. The controller may perform a translating process in response to a translation request containing the virtual address, the translating process translating the virtual address to the physical address based on the first storing region and the second storing region. When a second entry matching the first bit range of a first virtual address is hit through retrieving the second storing region in a first translating process performed in response to a first translation request containing the first virtual address, the controller may set, in the hit second entry, an identification number of one of the first entries that is specified by the first virtual address among one or more first entries associated with the hit second entry. When the second entry hit in the first translating process is hit through retrieving the second storing region in a second translating process performed in response to a second translation request containing a second virtual address and when an identification number of a first entry specified by the second virtual address is larger than an identification number set in the second entry, the controller may obtain information of one or more first entries subsequent to one or more first entries associated with the hit second entry from a memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of address information of an RPT entry;

DESCRIPTION OF EMBODIMENT(S)

Figure 1:
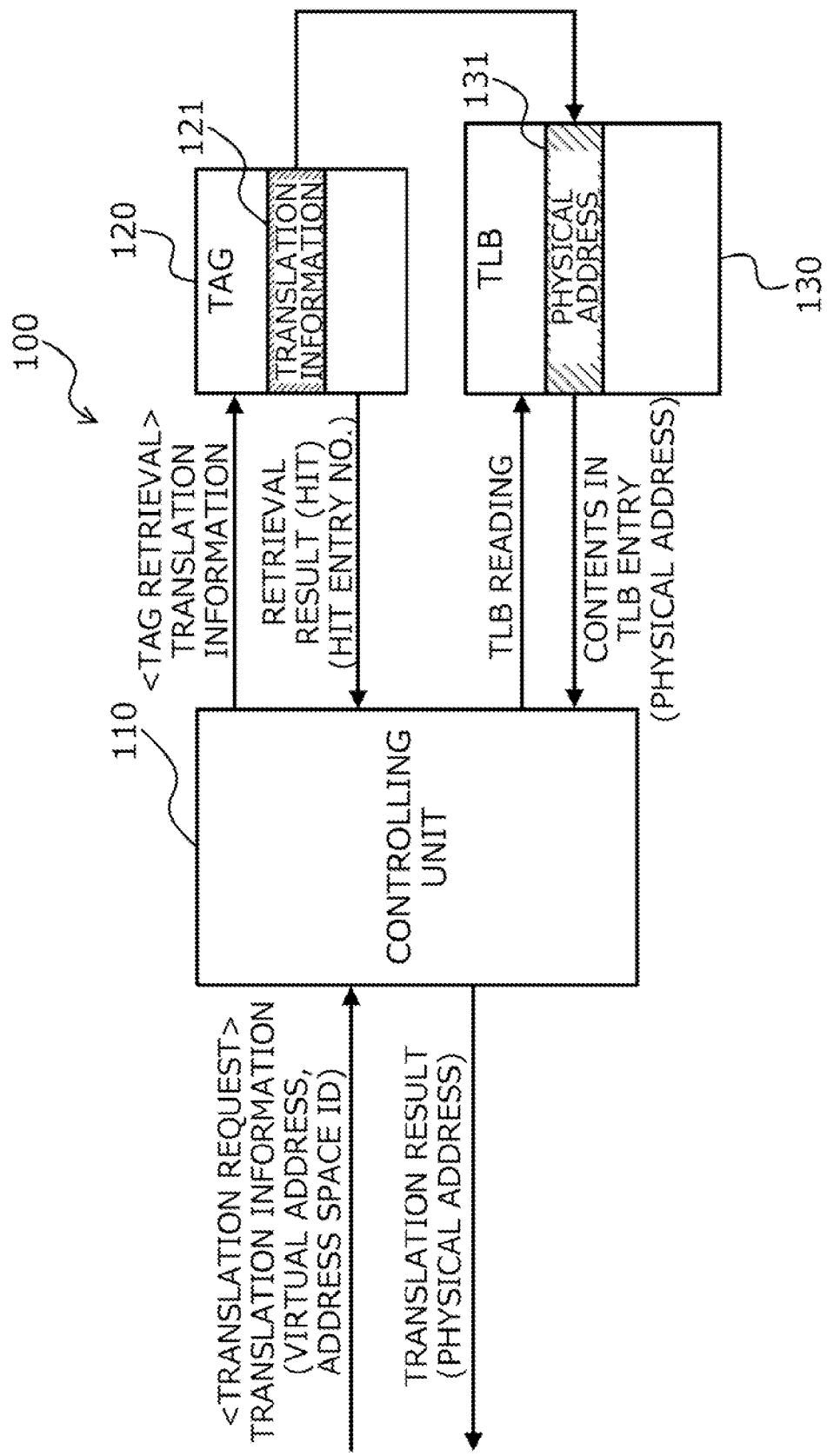
FIG. 1 is a diagram illustrating an example of an address translating process (when a TLB hit) in an MMU.

Hereinafter, an embodiment of the present invention will now be described with reference to the drawings. However, the embodiment described below is merely illustrative, and there is no intention to exclude application of various modifications and techniques that are not explicitly described below. For example, the present embodiment can be variously modified and implemented without departing from the scope thereof. In the drawings used in the following description, the same reference symbols denote the same or similar parts, unless otherwise specified.

Figure 2:
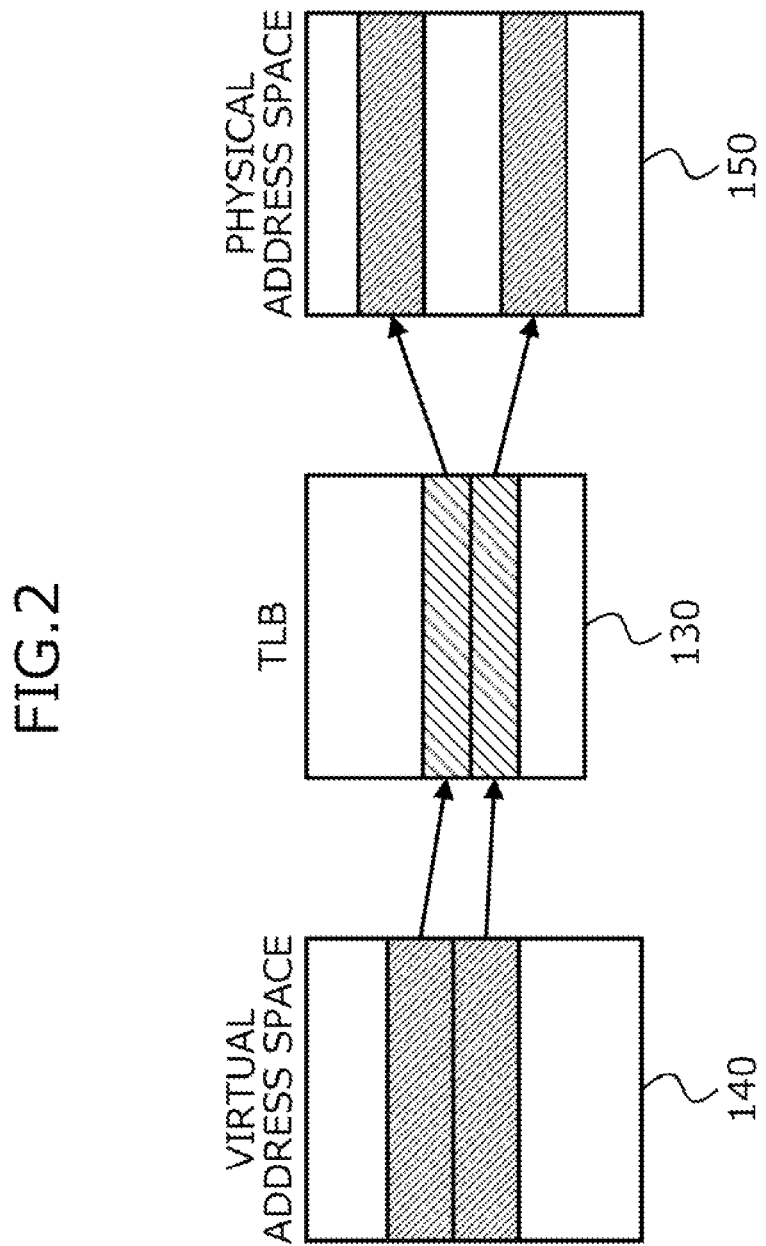
FIG. 2 is a diagram illustrating a TLB.
Figure 3:
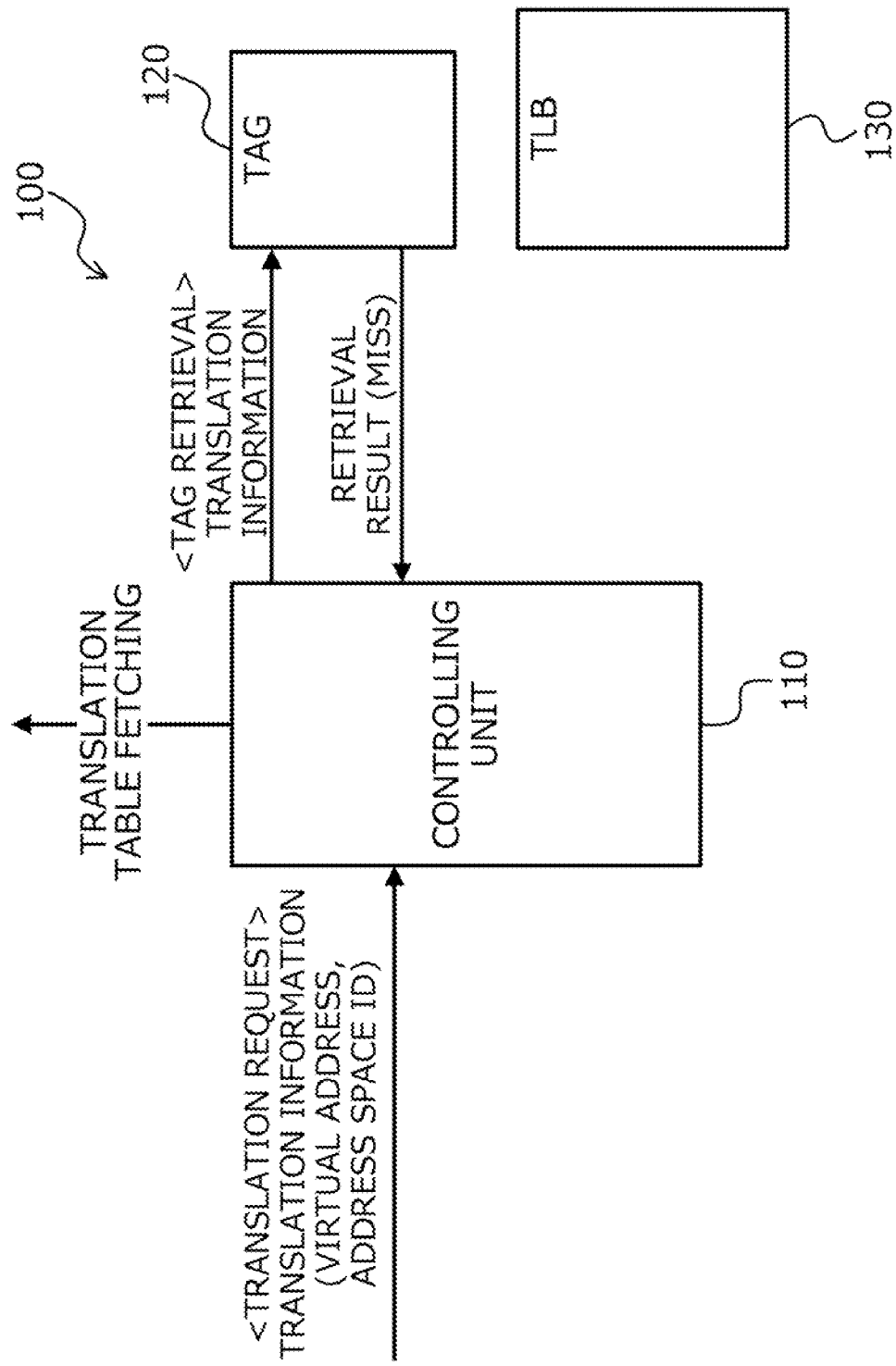
FIG. 3 is a diagram illustrating an example of an address translating process (when a TLB miss) in the MMU.
Figure 4:
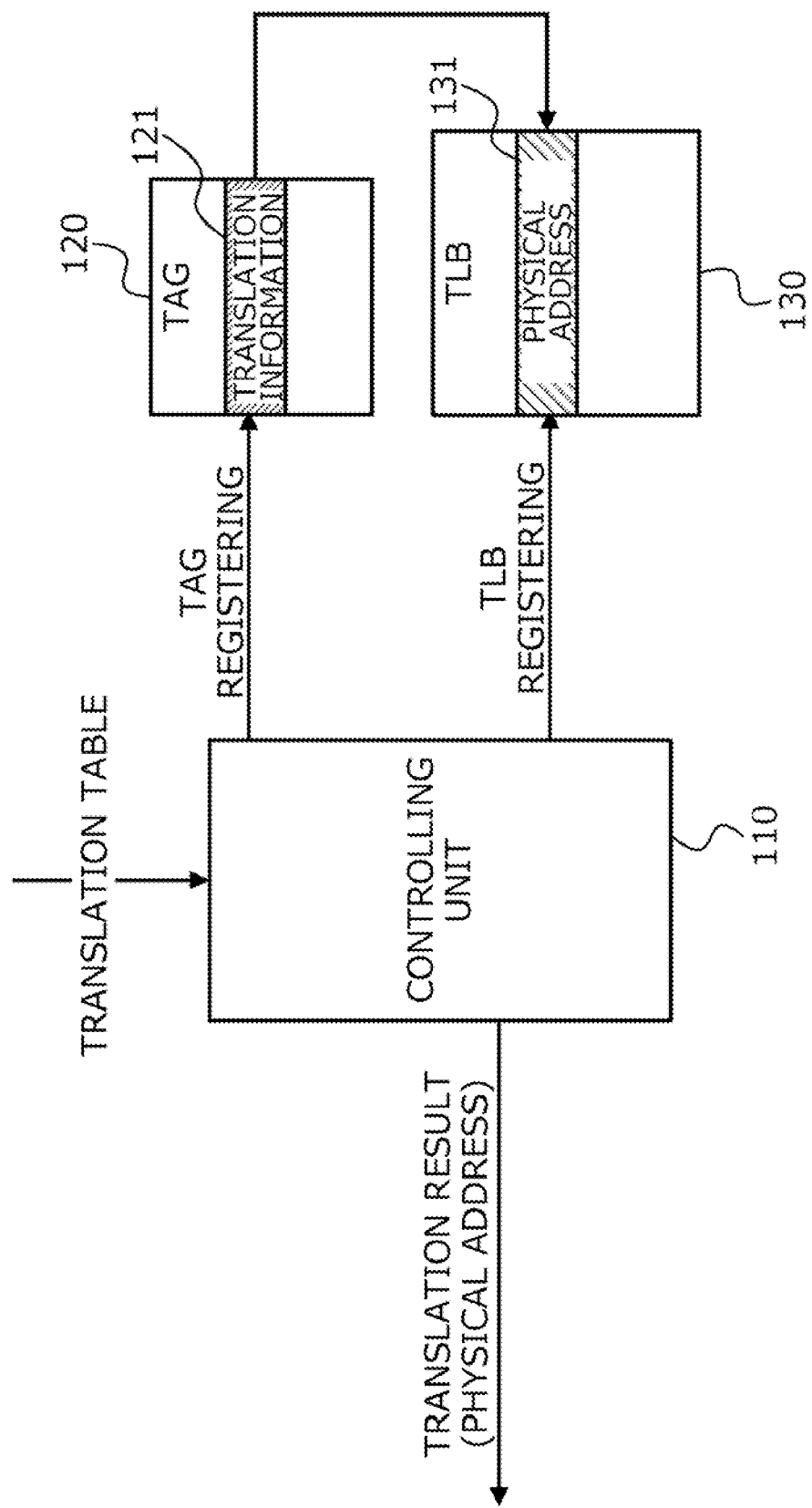
FIG. 4 is a diagram illustrating an example of a process performed after a translation table of FIG. 3 is obtained.

(1) One Embodiment (1-1) Description of Address Translating Process:

First of all, description will now be made in relation to an address translating process. FIG. 1 is a diagram illustrating an example of an address translating process (when a TLB hit) in an MMU 100; FIG. 2 is a diagram illustrating a TLB 130; FIG. 3 is a diagram illustrating an example of an address translating process (when a TLB miss) in the MMU 100; and FIG. 4 is a diagram illustrating an example of a process performed after a translation table of FIG. 3 is obtained.

As illustrated in FIG. 1, the MMU 100 includes a controlling unit 110, a tag 120, and the TLB 130.

The controlling unit 110 obtains a translation request and translation information from a translation requester such as a process. The translation information includes a virtual address to be translated and an address space ID assigned to each translation requester.

The tag 120 is a storing region that stores information associating translation information and the TLB 130 with each other, and the translation information is set in each entry (tag entry) 121.

A number (entry number, tag number) specifying a tag entry 121 corresponds to a number (TLB number) specifying an entry (TLB entry) 131 of the TLB 130. For example, a tag number may match a TLB number.

The TLB 130 is a storing region that stores information indicating the association relationship between a virtual address space 140 and a physical address space 150 (see FIG. 2), and a physical address is set in each TLB entry 131. One TLB entry 131 corresponds to one page.

A "page" is a size of the minimum unit (constant unit) of a translating process between a virtual address and a physical address. For example, providing that the bit width of an address is 64 bits and a page size is 4 KB, an association relationship between a virtual address and a physical address of the upper 52 bits is set in the TLB entry 131. The lower 12 bits of the virtual address is used as the lower 12 bits of the physical address without being modified.

The controlling unit 110 retrieves the tag 120 and determines whether or not an entry 121 matching the translation information (e.g., a virtual address and an address space ID) obtained from the translation requester exists in the tag 120. If an entry 121 matching the translation information exists in the tag 120 (TLB hit), the controlling unit 110 reads the contents of the TLB entry 131 associated with the entry 121 from the TLB 130. Thereby, the controlling unit 110 translates the virtual address to the physical address.

If an entry 121 matching the translation information does not exist in the tag 120 (TLB miss), the controlling unit 110 fetches a translation table indicating an association relationship between a virtual address and a physical address from the main memory (not illustrated) as illustrated in FIG. 3.

After obtaining the translation table from the main memory, the controlling unit 110 translates the virtual address to the physical address on the basis of the information of the translation table and outputs the physical address obtained as a result of the translation to the translation requester as illustrated in FIG. 4. Furthermore, the controlling unit 110 registers the translation information into a tag entry 121, and also registers the physical address indicated by the translation table into the TLB entry 131.

This allows, when the same virtual address is to be translated in response to a subsequent translation request, the controlling unit 110 to detect the tag entry 121 matching the virtual address (TLB hit), so that the translating process can be accomplished rapidly.

However, in the first translation request, which resulted in a TLB miss, an access to the main memory occurs as described above (see FIG. 3) and may therefore increase the translating processing time.

Here, a single tag entry 121 may be associated with multiple TLB entries 131 as well as one-to-one association.

Figure 5:
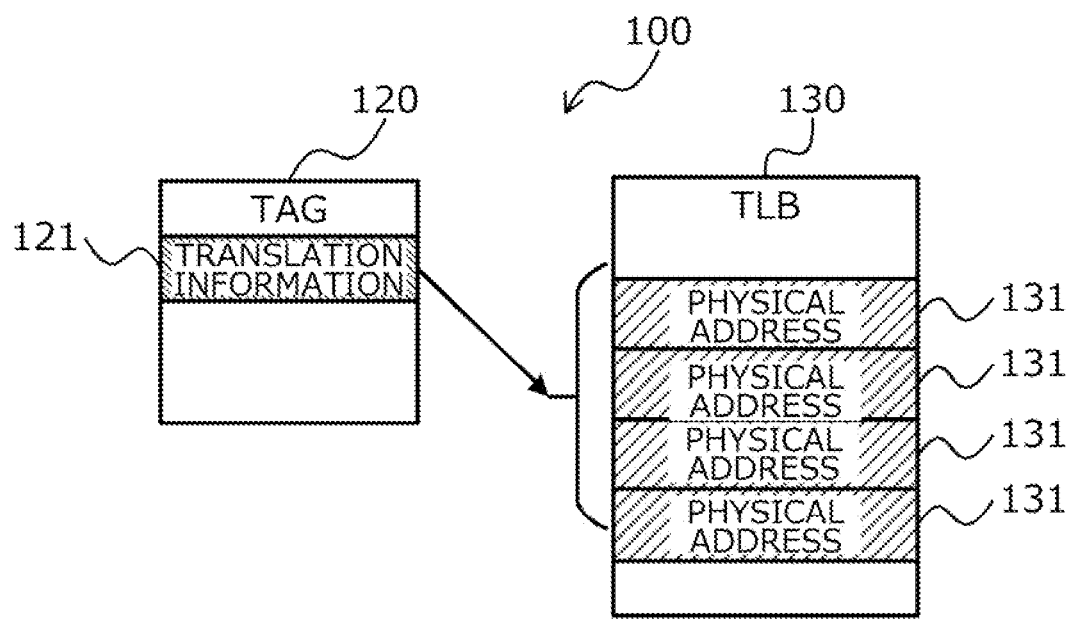
FIG. 5 is a diagram illustrating an example of a relationship between a tag entry and a TLB entry.

FIG. 5 is a diagram illustrating an example of a relationship between a tag entry 121 and a TLB entry 131. FIG. 5 illustrates an example associating one tag entry 121 with four TLB entries 131 successive on the virtual address space. In the example of FIG. 5, upper bits common to the virtual addresses of the four pages are stored in the translation information of the tag 120.

Figure 6:
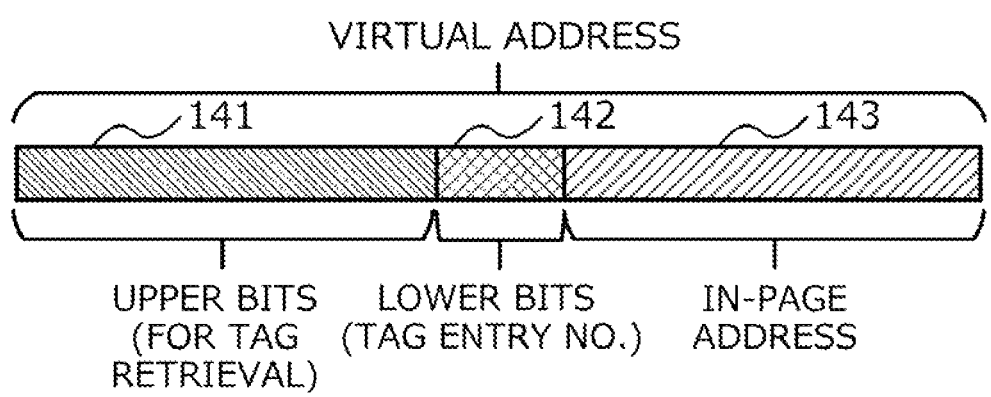
FIG. 6 is a diagram illustrating an example of a format of a virtual address.

FIG. 6 is a diagram illustrating an example of a format of a virtual address. As illustrated in FIG. 6, a virtual address includes domains of upper bits 141 for tag retrieval, lower bits 142 indicating a tag entry number, and an in-page address 143. The upper bits 141 are a bit range of a given number of upper bits of the virtual address and is an example of a first bit range. The lower bits 142 are a bit range of a given number of bits subsequent to the first bit range of the virtual address, and is an example of a second bit range.

For example, when a page size is 4 KB and a single (one page) tag entry 121 is associated with four (four pages) TLB entries 131, the lower bit 142 has a two-bit width and the in-page address 143 has a 12-bit width.

When retrieving a tag 120 on the basis of a virtual address included in the translation request, the MMU retrieves a tag entry 121 having translation information matching the upper bits 141 of the virtual address. If a tag entry 121 having matching translation information exists, the MMU specifies a TLB entry 131 of one page among the four pages associated with the tag entry 121, using the lower bits 142.

Figure 7:
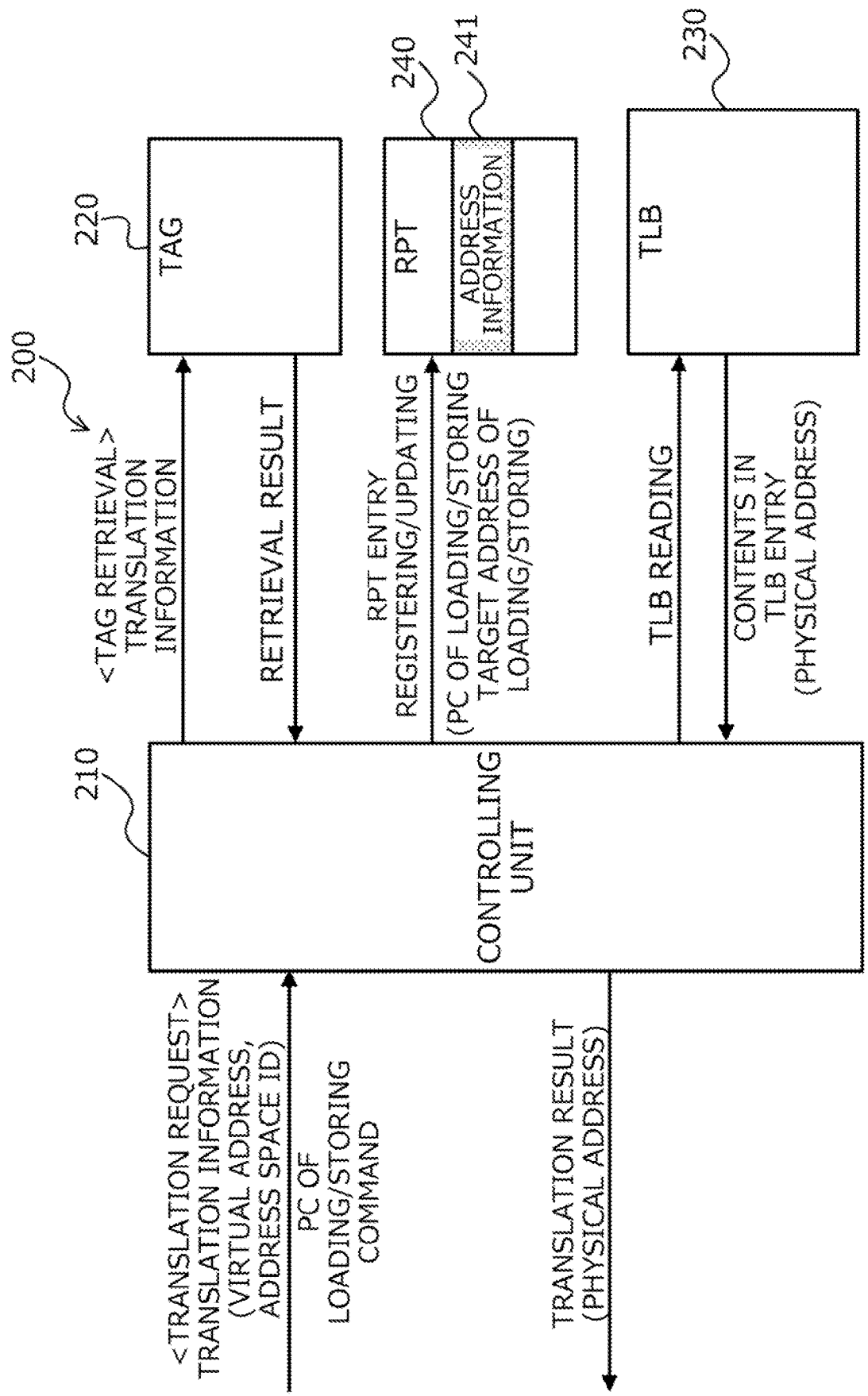
FIG. 7 is a diagram illustrating an example of an address translating process in an MMU having an RPT.

FIG. 7 is a diagram illustrating an example of an address translating process in an MMU 200 having an RPT 240, and FIG. 8 is a diagram illustrating an example of address information of an RPT entry 241.

As illustrated in FIG. 7, the MMU 200 further includes the RPT 240 in addition to a controlling unit 210, a tag 220, and a TLB 230, and achieves TLB prefetching by predicting a virtual address that a translation requester will access next, using the RPT 240.

The RPT 240 is a storing region that stores information relating to an access destination of the translation requester, and has entries (RPT entries) each in which address information is set. The controlling unit 210 executes an updating process of the RPT 240 and the address translating process in parallel with each other.

As illustrated in FIG. 8, the address information of an RPT entry 241 may include fields of "PC (Program Counter)", "target address", "stride", and "state", for example. The "PC" is an example of identification information of a store/load command, and may be information representing an address on a main memory where the store or load command to be executed is stored. The "target address" is a virtual address of an access target of the main memory that the store/load command is to access. The "stride" is a difference between the "target address" and a target address of the access target when the same store/load command was executed previously (most recently). The "state" represents the state of an entry, such as "newly registration", "difference newly registration", and "difference matching", for example.

As illustrated in FIG. 7, the controlling unit 210 obtains the PC of a load/store command of the translation requester along with the translation information when receiving a translation request, and updates the entry 241 of the RPT 240, using the obtained PC and the virtual address contained in the translation information. For example, when a load command having a PC of "500" has been executed for three times and the virtual addresses of the load command from the first to the third times are "1000", "1004", and "1008", the controlling unit 210 updates the following entries 241.

(First time) PC: 500, Target Address: 1000, Stride: -, State: Newly Registration (Second time) PC: 500, Target Address: 1004, Stride: 4, State: Difference Newly Registration (Third time) PC: 500, Target Address: 1008, Stride: 4, State: Difference Matching The state "Newly Registration" of the first time represents the first registration of an entry having a PC "500", and the state "Difference Newly Registration" of the second time presents the first registration of the stride "4" (="1004"–"1000") of the PC "500". The "Difference Matching" of the third time represents that the stride "4" (="1008"–"1004") of the PC "500" matches the stride of the previous time (second time).

When a TLB miss occurs in a translating process on a store/load command having a "PC" matching with one stored in the RPT 240, the controlling unit 210 specifies a virtual address, which is a sum of a stride of a RPT entry 241 associated with the PC and the virtual address related to the translation request. Then the controlling unit 210 prefetches information of a TLB 230 associated with the specified virtual address, which is a virtual address having a high possibility of being accessed next.

For example, when a load command is to access a virtual address "012", the controlling unit 210 prefetches a translation table associated with a target address "1016" (="1012"+"4") from the main memory and registers the translation table into the TLB 230.

The prefetching using the RPT 240 uses the following properties of an address of the main memory.

If a PC of a load/store command is the same when a process executes repeating processes such as Loops, the repeating processes have a high possibility of taking an access pattern the same as that of the previous repeating process.

One of the memory access patterns is an access pattern called a stride access, which is an access in which the virtual address increases in increment of a constant value K (where, K is an integer) exemplified by "A"→"A+K"→"A+2K" . . . . In the above example, A=1000 and K=4.

However, in the prefetching scheme using the RPT 240 as the above, the MMU 200 includes the RPT 240 separately from the TLB 230 which leads to increase in circuitry volume (physical volume).

As a solution to the above, the one embodiment describes a scheme to achieve TLB prefetching that can deal with an access pattern of a stride access, suppressing increase in a hardware physical volume. For example, in the one embodiment, the MMU reduces the occurring frequency of a TLB miss and suppress prolonging of a translation processing time by storing information of a memory access pattern into a tag that manages a virtual address and a TLB in association with each other and executing TLB prefetching based on the stored information.

Figure 9:
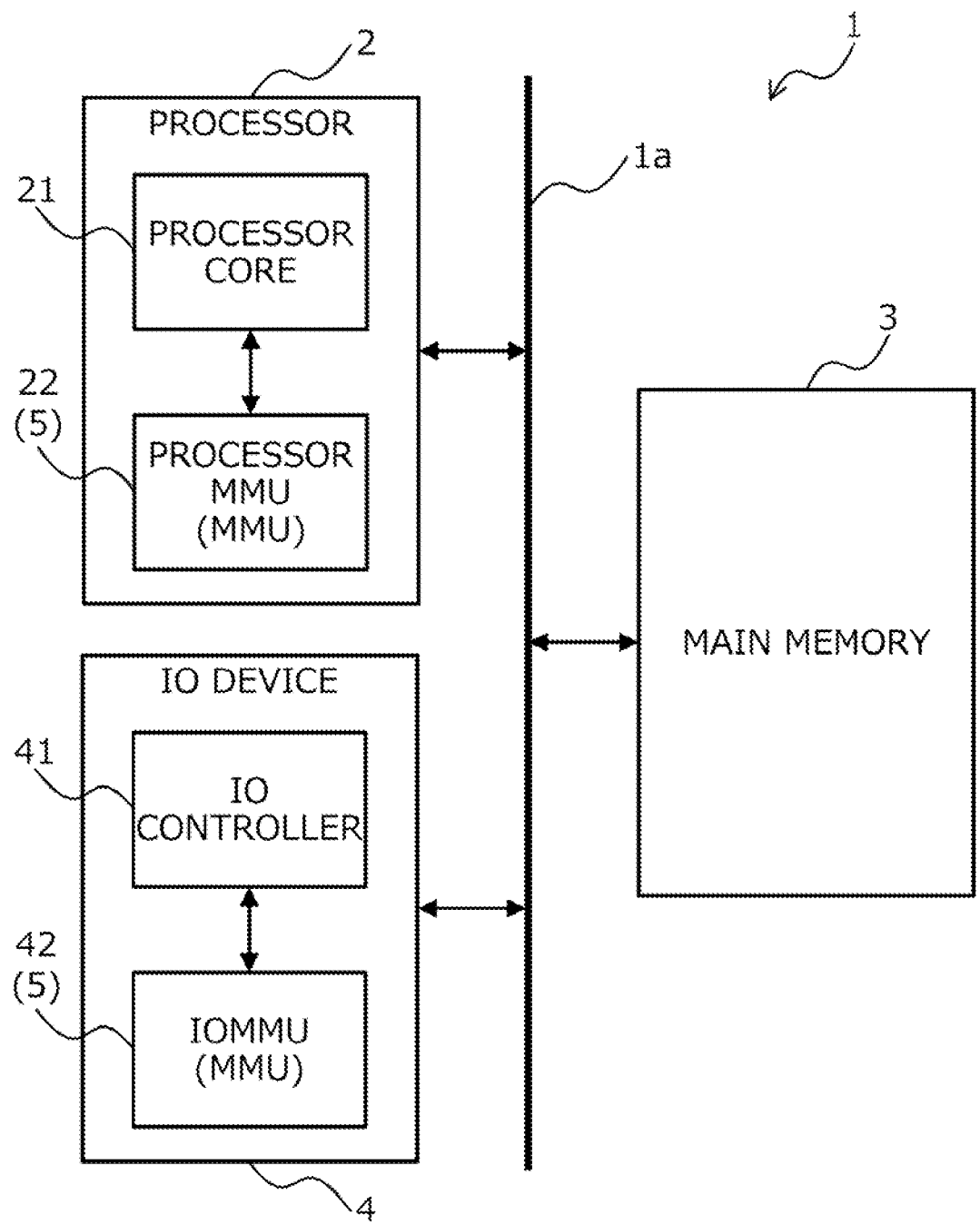
FIG. 9 is a block diagram schematically illustrating an example of a hardware (HW) configuration focused on an address translating process in a computer according to the one embodiment.

(1-2) Example of Hardware Configuration of Computer of One Embodiment:

FIG. 9 is a block diagram schematically illustrating an example of a hardware (HW) configuration focused on an address translating process in the computer 1 according to one embodiment.

As illustrated in FIG. 9, the computer 1 illustratively includes a processor 2, a main memory 3, and an IO device 4 as the HW configuration focused on an address translating process.

In addition to the configuration of FIG. 9, the computer 1 may further include various devices exemplified by a storing device such as a Hard Disk Drive (HDD) or a Solid State Drive (SSD), an inputting device such as a mouse and a keyboard, and a displaying device such as a monitor.

The processor 2 is an example of an arithmetic processing device that performs various types of controls and calculations. The processor 2 may be communicably connected to each of the blocks in the computer 1 via a bus 1a. The processor 2 may be a multi-processor including multiple processors and a multi-core processor including multiple processor cores, and may have a structure including multi-core processors.

The processor 2 may be any one of integrated circuits (ICs) such as Central Processing Units (CPUs), Micro Processing Units (MPUs), Graphics Processing Units (GPUs), Accelerated Processing Units (APUs), Digital Signal Processors (DSPs), Application Specific Integrated Circuits (ASICs), and Field Programmable Gate Arrays (FPGAs), or combinations of two or more of these ICs.

As illustrated in FIG. 9, the processor 2 may include a processor core 21 and a processor MMU 22. The processor 2 may multiple processor cores 21.

The processor core 21 executes an OS program expanded on the main memory 3, and executes one or more processes on the OS. The process has an independent virtual address space and assigns a storing destination (address) on the main memory 3 with the virtual address. The processor core 21 notifies the processor MMU 22 of a translation request for translating a virtual address to a physical address of the main memory 3, and accesses the main memory 3, using the physical address obtained as a result of the translation performed by the processor MMU 22.

The processor MMU 22 is an example of a memory management unit or a memory management apparatus, and executes an address translating process in response to a translation request from the processor core 21 and responses the processor core 21 with the translation result.

The main memory 3 is an example of a HW device that stores information such as various data and programs. Examples of the main memory 3 includes one or the both of a volatile memory such as a Dynamic Random Access Memory (DRAM) and a non-volatile memory such as a Persistent Memory (PM).

The IO device 4 is an example of a network Interface (IF) or a communication IF that communicates with the processor 2 and the main memory 3, and is capable of access, e.g., Direct Memory Access (DMA), to the main memory 3.

For example, the IO device 4 may be a Local Area Network (LAN) such as an Ethernet (registered trademark) or a Network Interface Card (NIC) having an adaptor conforming to an optical communication such as a Fibre Channel (FC).

As illustrated in FIG. 9, the IO device 4 may include an IO controller 41 and an IOMMU 42.

The IO controller 41 executes various controls, including access to the main memory 3, in the IO device 4. For example, the IO controller 41 may access the main memory 3 on the basis of a packet received from an apparatus (external apparatus to the computer 1) coupled via an adaptor and a network.

A packet may assign an access destination (address) on the main memory 3 with a virtual address. The IO controller 41 notifies the IOMMU 42 of a translation request for translating a virtual address included in a packet to a physical address of the main memory 3, and accesses the main memory 3, using the physical address obtained as a result of the translation by the IOMMU 42.

The IOMMU 42 is an example of a memory management unit or a memory management apparatus, and executes an address translating process in response to the translating request from the IO controller 41 and responds to the IO controller 41 with the translating result.

The processor MMU 22 is the same in configuration and operation as the IOMMU 42. Hereinafter, not discriminating the processor MMU 22 and the IOMMU 42 from each other, the processor MMU 22 and the IOMMU 42 are referred to as the "MMU 5".

Figure 10:
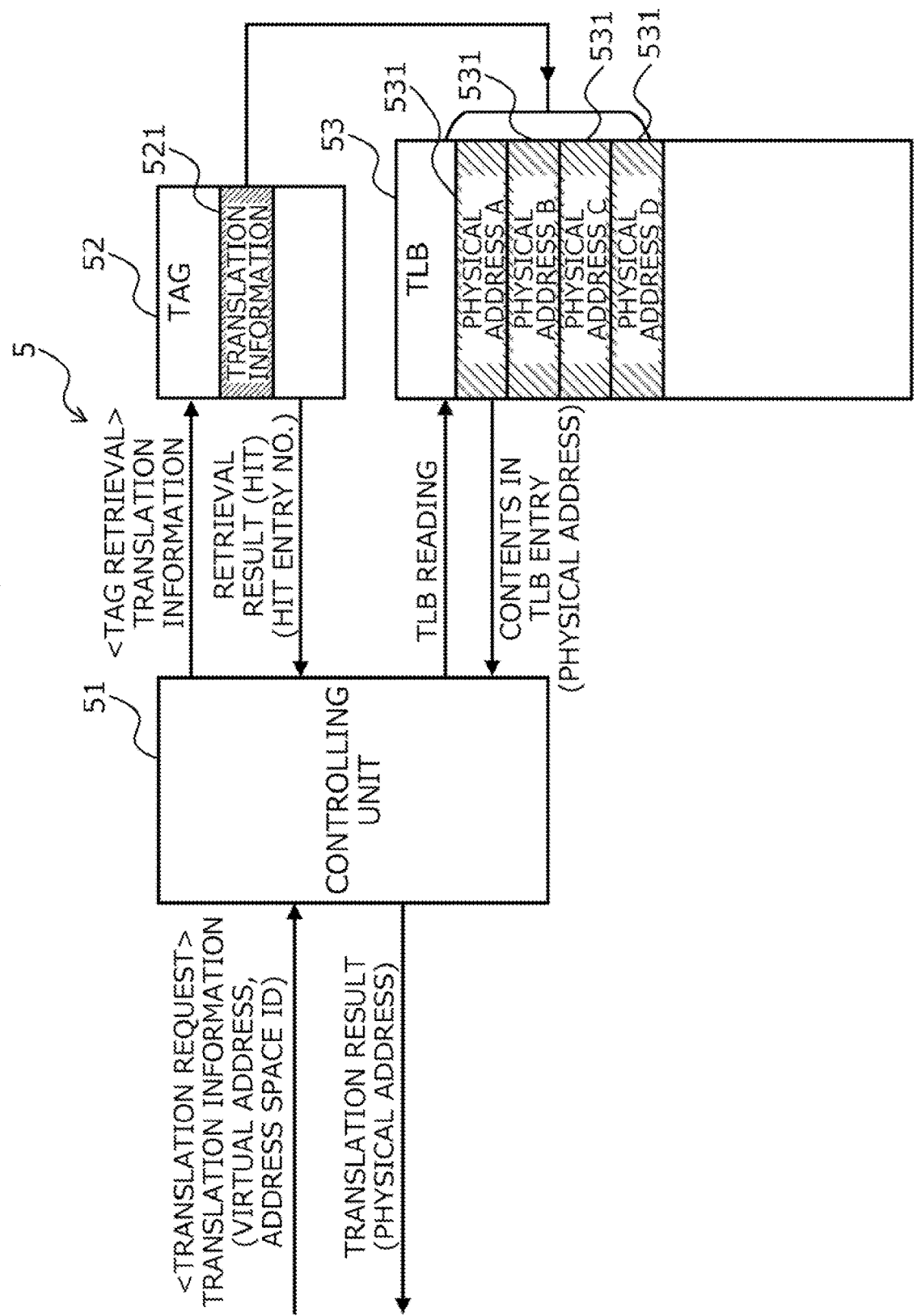
FIG. 10 is a diagram illustrating an example of a HW configuration of an MMU according to the one embodiment.

(1-3) Description of the MMU of One Embodiment:

FIG. 10 is a diagram illustrating an example of a HW configuration of the MMU 5 according to the one embodiment. As illustrated in FIG. 10, the MMU 5 may illustratively include a controlling unit 51, a tag 52, and a TLB 53. The configuration and various pieces of information of FIG. 10 are the same as those having the respective same name in FIGS. 1, 3, 4, and 7, unless otherwise specified.

The controlling unit 51 executes a translating process that translates a virtual address to a physical address on the basis of the tag 52 and the TLB 53 in response to a translation request containing the virtual address. For example, the controlling unit 51 obtains the translation request and the translation information from the translation requester and executes the translating process including a TLB prefetching process. Examples of the translation requester are a process executed by the processor core 21, and a packet processed by the IO controller 41.

The tag 52 is a storing region that stores information associating the translation information and the TLB 53 with each other, and has entries (tag entries) 521 each of which stores translation information. The tag 52 is an example of a second storing region that stores the second entry 521. The tag entry 521 is an example of a second entry that associates the first bit range of the virtual address with the one or more TLB entries 531.

The tag entry 521 of the tag 52 and the TLB entry 531 may be associated with each other in one-to-one correspondence or may be associated with each other in one-to-multiple correspondence as illustrated in FIGS. 5 and 10.

The translation information may include a virtual address to be translated and an address space ID assigned to each translation requester (e.g., process). The address space ID is an example identification information of an address space assigned to an issuing source of the translation request.

The TLB 53 is a storing region that stores information indicating an association relationship between a virtual address space and a physical address space (see FIG. 2) and has entries (TLB entries) 531 each of which stores a physical address. The TLB 53 is an example of a first storing region that stores one or more TLB entries 531. A TLB entry 531 is an example of a first entry indicating a physical address matching the first bit range of the virtual address.

Here, the MMU 5 of the one embodiment causes the tag 52 to hold information to be used for determination as to whether to execute TLB prefetching. This allows the MMU 5 (computer 1) to omit an RPT and consequently suppress an increase in HW circuitry volume.

Figure 11:
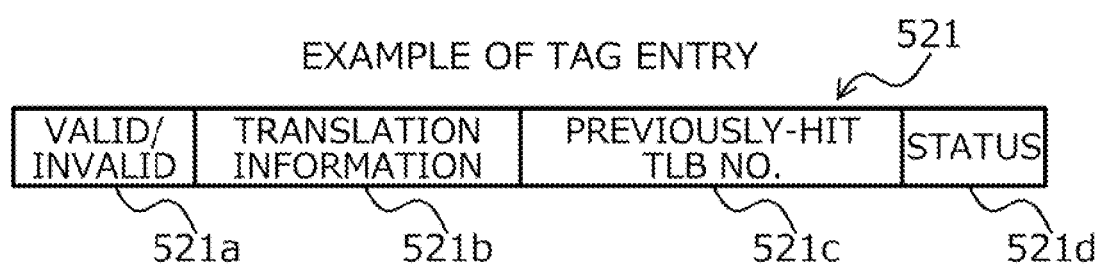
FIG. 11 is a diagram illustrating an example of a tag entry.
Figure 12:
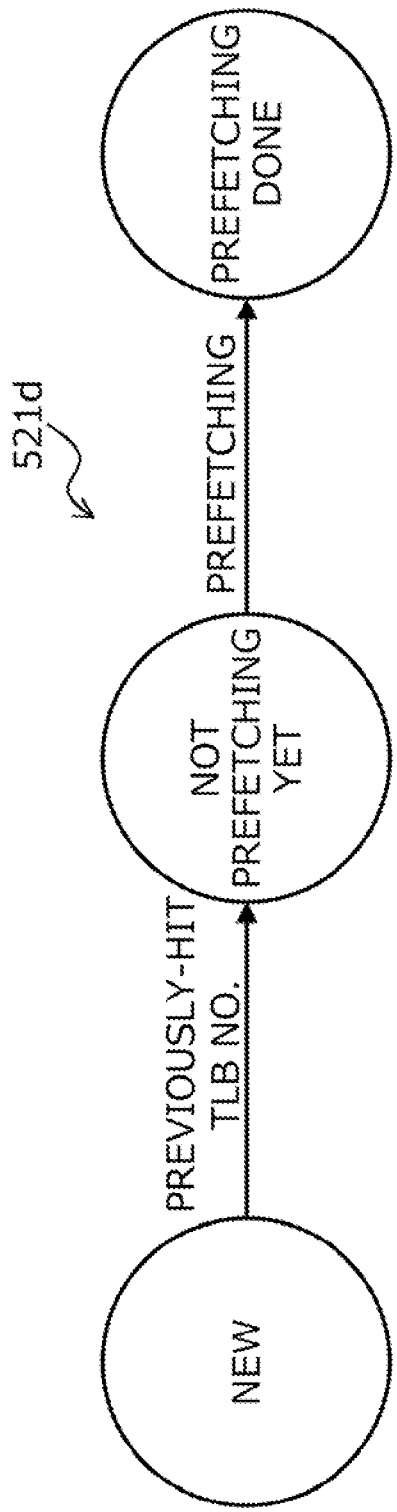
FIG. 12 is a diagram illustrating an example of a status transition in a status field of a tag entry.

FIG. 11 is a diagram illustrating an example of a tag entry 521, and FIG. 12 is a diagram illustrating an example of a status transition in a status field of a tag entry 521. As illustrated in FIG. 11, the tag entry 521 may illustratively include a flag 521a indicating whether the entry is "valid" or "invalid", translation information 521b, a previously-hit TLB number 521c, and a status 521d.

The flag 521a is an example of information indicating whether the tag entry 521 is valid or invalid. For example, the flag 521a, when being set to "1", may indicate that the tag entry 521 is valid (or invalid) and the flag 521a, when being set to "0", may indicate that the tag entry 521 is invalid (or valid).

The translation information 521b may include a virtual address to be translated and an address space ID assigned to each translation requester (e.g., each process). Since the tag entry 521 includes the translation information 521b containing an address space ID as the above, it can be said that the controlling unit 51 sets the tag entry 521 of the tag 52 for each address space ID.

The TLB number 521c indicates the number of the TLB 53 that is hit previously (most recently). For example, the TLB number 521c may be a TLB number associated with the tag entry 521 hit in retrieval of the tag 52 using the translation information included in the translation request. The number (entry number, tag number) indicating a tag entry 521 may correspond to a number (TLB number) indicating a TLB entry 531. For example, the tag number may match the TLB number.

If a single tag number associated with multiple TLB numbers, the tag number may indicate a range covering the multiple TLB entries 531. If a tag number indicates a range covering the multiple TLB entries 531, the TLB numbers may be indices of the TLB entries 531 within the range and are exemplified by values indicated by the lower bits 142 (see FIG. 6) of the virtual address. In other words, the TLB number 521c is an example of an identification number of one TLB entry 531 that is specified on the basis of the virtual address among one or more TLB entries 531 associated with the hit tag entry 521.

The status 521d indicates the status of the tag entry 521. For example, the status 521d may be statuses of "new", "not prefetching yet", and "prefetching done", as illustrated in FIG. 12. The status "new" represents an initial status when the tag entry 521 is newly registered. The status "not prefetching yet" represents a status that TLB prefetching based on the tag entry 521 is not performed yet. The status "prefetching done" represents a status that TLB prefetching based on the tag entry 521 is already performed.

The controlling unit 51 sets the hit TLB number to the previously-hit TLB number 521c of the tag entry 521, in the TLB prefetching process. If the TLB number currently hit in the translating process increases by "one" or more from the previously-hit TLB number 521c in the tag entry 521, the controlling unit 51 prefetches information of the next TLB 53.

For example, when a single entry 521 is associated with multiple TLB entries in one-to-n (where, n is an integer of two or more) correspondence, the controlling unit 51 may prefetch the number n of TLB entries 531.

If the value of the currently-hit TLB number increases from the previously-hit TLB number 521c of the tag entry 521 even if the currently-hit TLB number is not succeeding to the previously-hit TLB number 521c, the controlling unit 51 may prefetch the next TLB 53.

For example, when a stride access is occurring, there is a high possibility that the next or subsequent translation request requests translation of a virtual address associated with a TLB number larger than the currently-hit TLB number. As described above, a stride access has a possibility that the addresses of the access targets are not be succeeded (accesses at regular-size intervals).

Considering the above, the controlling unit 51 uses that a currently-hit TLB number is larger than the previously-hit TLB number 521c as one of the conditions of detecting occurrence of a stride access. Upon detection of occurrence of a stride access, the controlling unit 51 prefetches the next n TLB entries 531, for example. This allows the controlling unit 51 to suppress prolonging of translation processing time with a simpler configuration than an RPT.

Figure 13:
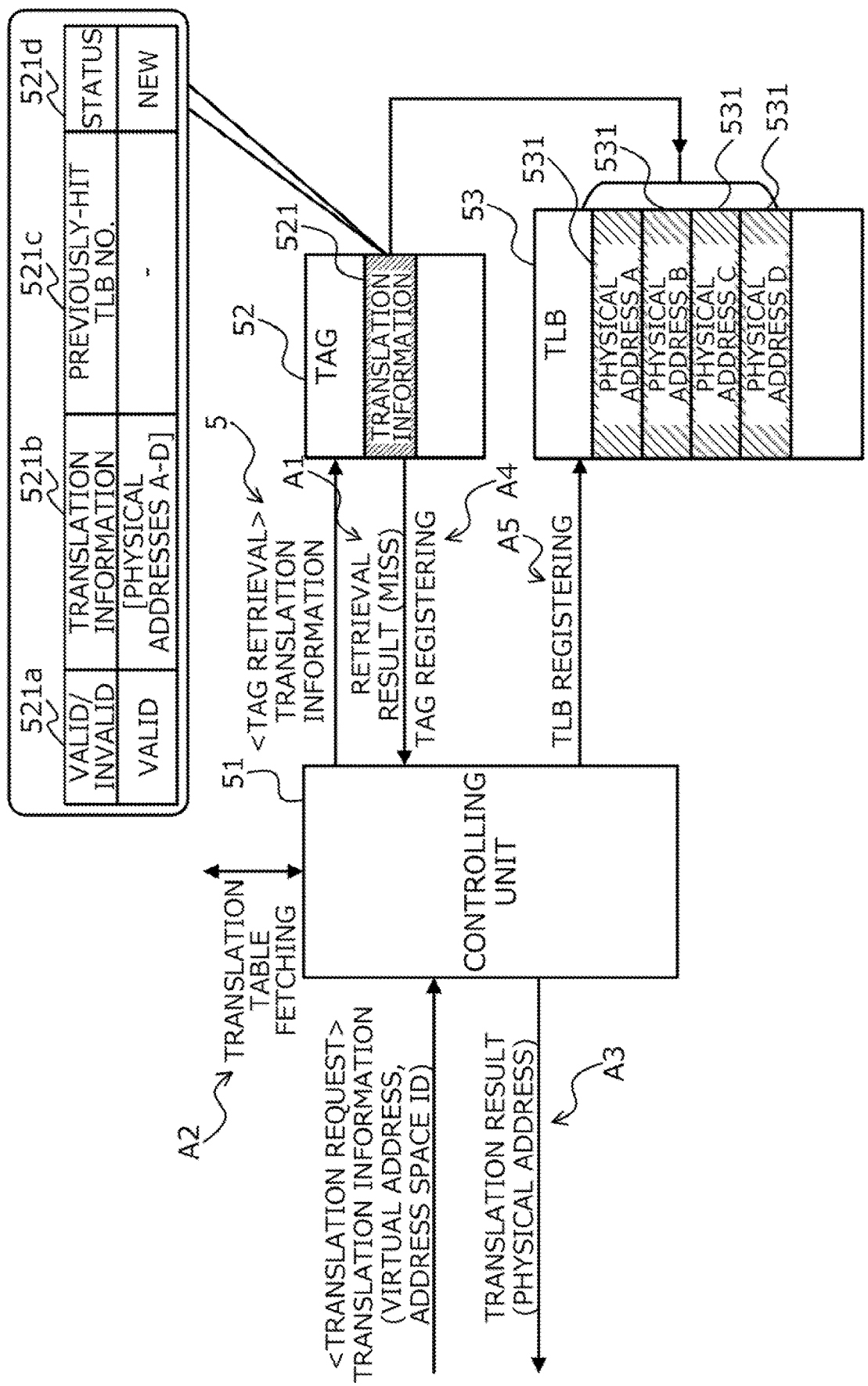
FIG. 13 is a diagram illustrating an example of operation of an address translating process performed by a controlling unit.
Figure 14:
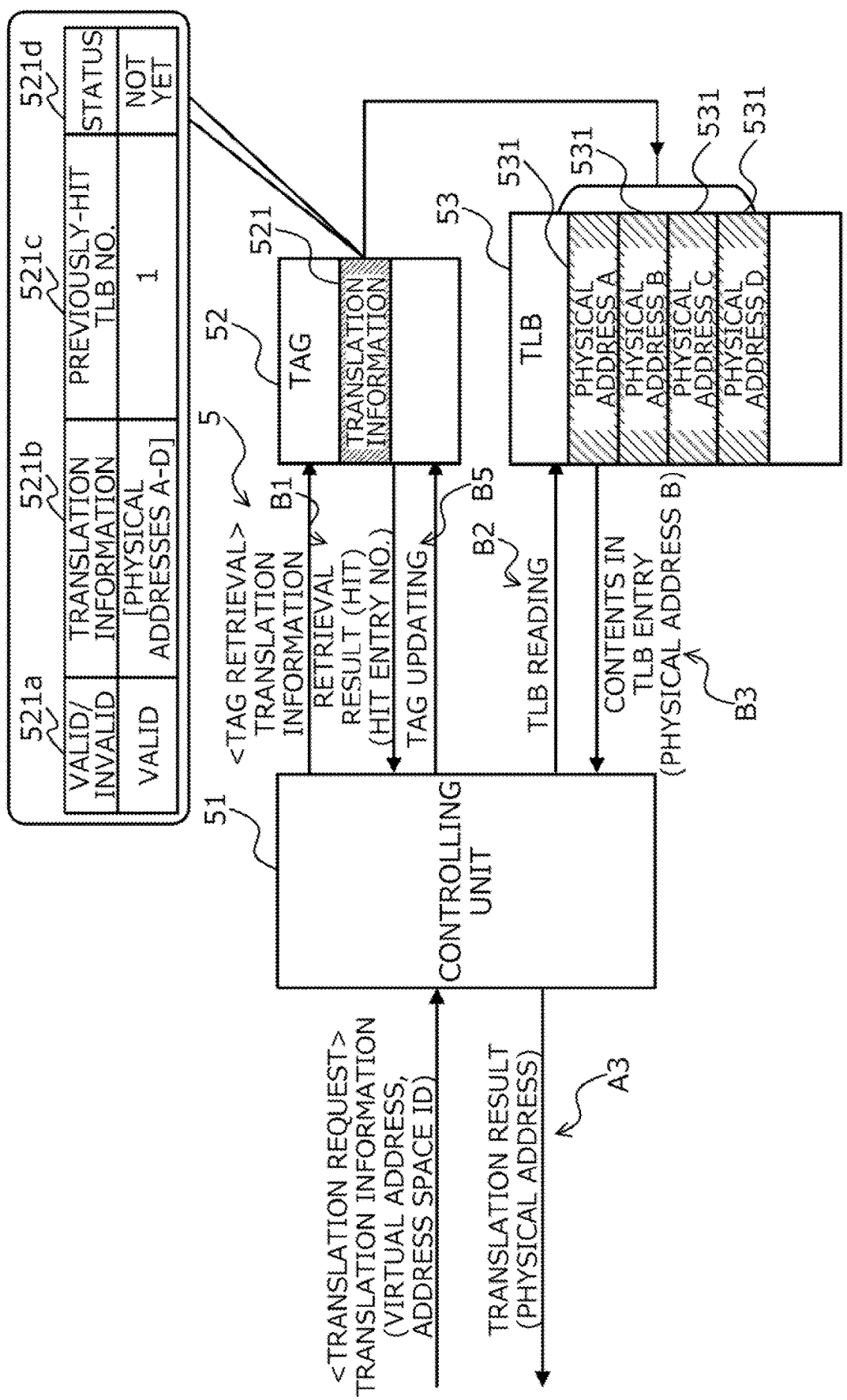
FIG. 14 is a diagram illustrating an example of the operation of the address translating process performed by the controlling unit.
Figure 15:
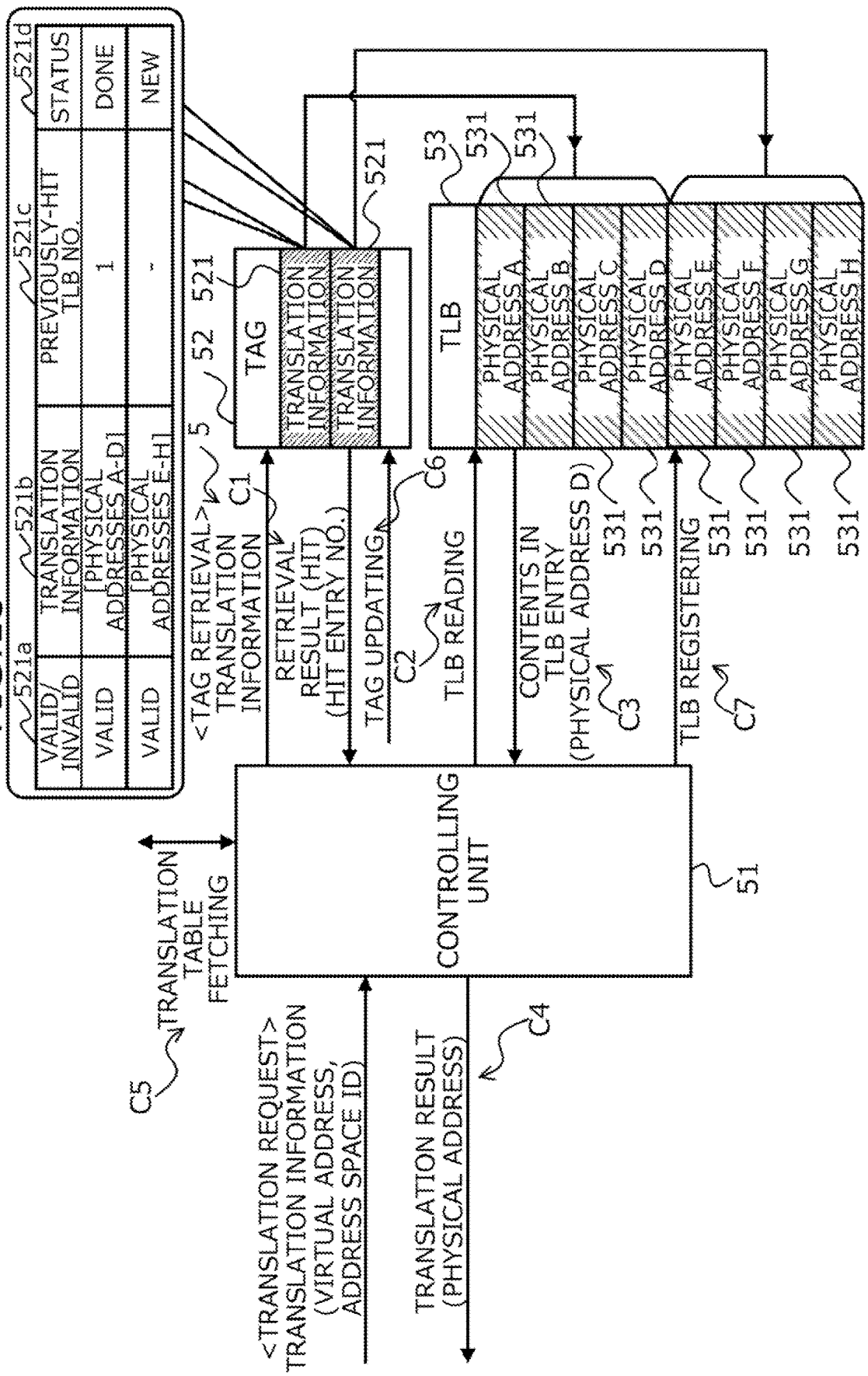
FIG. 15 is a diagram illustrating an example of the operation of the address translating process performed by the controlling unit.

Next, description will now be made in relation to an example of the address translating process performed by the controlling unit 51 with reference to FIGS. 13-15. FIGS. 13-15 are diagrams illustrating an example of the operation of the address translating process performed by the controlling unit 51. The description of FIGS. 13-15 assumes that a single tag entry 521 is associated four TLB entries 531 (i.e., one-to-four correspondence, n=4).

The controlling unit 51 obtains a translation request containing a virtual address and translation information from the translation requester and retrieves a tag 52 based on the virtual address and the translation information. For example, the controlling unit 51 determines whether a tag entry 521 matching the upper bits of the virtual address and an address space ID exists in the tag 52 (i.e., TLB hit or not).

As illustrated in FIG. 13, when a TLB miss occurs in a translating process performed in response to the translation request (see Arrow A1), the controlling unit 51 fetches a translation table from the main memory 3 (see Arrow A2). The controlling unit 51 responds to the translation requester with a physical address (e.g., physical address A) based on the translation table (see Arrow A3).

In addition, the controlling unit 51 registers the tag entry 521 and the TLB entries 531 into the tag 52 and the TLB 53, respectively (see Arrows A4 and A5). Either the process of Arrow A3 or the process of Arrows A4 and A5 may be performed earlier or the processes may be at least partially performed in parallel.

In the example of FIG. 13, the upper bits common to the virtual addresses of four pages, as the tag entry 521 to be registered, are stored into the translation information 521b. The virtual addresses of the four pages are each associated with one of physical addresses A-D. Since this entry is newly registered, no value is set into the TLB number 521c. The value "new" is set into the status 521d. In the example of FIG. 13, the controlling unit 51 registers the tag entry 521 associated with the physical addresses A-D of the TLB entry 531 as described above.

Next, description will now be made in relation to an example of a translating process performed when a TLB bit occurs in a translating process in response to a translation request subsequent to the operation of FIG. 13 by referring to FIG. 14. The translating process of FIG. 14 is an example of a first translating process in response to a first translation request including the first virtual address. Description made with reference to FIG. 14 assumes that a tag entry 521 which matches the upper bits 141 (see FIG. 6) of the first virtual address (and an address space ID) is hit through retrieval of the tag 52 in the translating process.

As illustrated in FIG. 14, when a TLB bit occurs in the translating process in response to a translation request subsequent to the operation of FIG. 13 (see Arrow B1), the controlling unit 51 refers to a TLB entry 531 that the translation information 521b indicates (see Arrow B2). The controlling unit 51 responds to the translation requester with a physical address (e.g., physical address B, see Arrow B3) of the entry contents (Contents of TLB entry) obtained from the TLB entry 531 (see Arrow B4).

Furthermore, the controlling unit 51 updates the tag entry 521 (see Arrow B5). For example, the controlling unit 51 updates the status 521d of the tag entry 521 to "not prefetching yet" (denoted as "Not Yet" in FIG. 14) and sets a TLB number "1", which indicates the TLB entry 531 obtained in the process of Arrow B3, in the previously-hit TLB number 521c. Either the process of Arrow B4 or the process of Arrow B5 may be performed earlier or the processes may be at least partially performed in parallel.

As described above, the controlling unit 51 sets an identification number of a single TLB entry 531 specified on the basis of the first virtual address among one or more TLB entries 531 associated with the hit tag entry 521 in the hit tag entry 521.

Next, description will now be made in relation to an example of translating process performed when a TLB hit occurs in a translating process in response to a translation request subsequent to the operation of FIG. 14 by referring to FIG. 15. The translating process of FIG. 15 is an example of a second translating process in response to a second translation request including the second virtual address. Description made with reference to FIG. 15 assumes that a tag entry 521 which matches the upper bits 141 (see FIG. 6) of the second virtual address (and an address space ID) and which is the same as the tag entry 521 hit in the operation of FIG. 14 is hit through retrieval of the tag 52 in the translating process.

As illustrated in FIG. 15, when a TLB hit occurs in the translating process in response to a translation request subsequent to the operation of FIG. 14 (see Arrow C1), the controlling unit 51 refers to a TLB entry 531 that the translation information 521b indicates (see Arrow C2). The controlling unit 51 responds to the translation requester with a physical address (e.g., physical address D, see Arrow C3) of the entry contents (Contents of TLB entry) obtained from the TLB entry 531 (see Arrow C4).

If the status of the tag entry 521 when the TLB hit satisfies a prefetching condition, the controlling unit 51 executes the prefetching. The prefetching condition is, for example, satisfying both of the following conditions (i) and (ii).

(i) The status 521d of the tag entry 521 is "not prefetching yet".
(ii) The TLB number indicating the TLB entry 531 obtained in step of Arrow C3 is larger than the previously-hit TLB number 521c of the tag entry 521, which means that the TLB entry number of the current TLB bit increases.

If the status 521d of the tag entry 521 satisfies the prefetching condition, the controlling unit 51 prefetches the information of the next TLB 53 (see Arrow C5). The information of the next TLB 53 is one or more (e.g., n) successive TLB entries 531 which are subsequent to the currently-hit TLB entry 531 and which have not been obtained yet, for example.

For example, the controlling unit 51 may calculate a virtual address corresponding to the information of the next TLB 53, using the following Expression (1), and prefetch a translation table associated with the calculated virtual address from the main memory 3.

[virtual address to be prefetched]=[virtual address to be translated]+[page size]×[TLB entry number associated with tag]  (1)

The following description assumes a case where a TLB hit occurs in a translating process of a virtual address "0x1_0000" and prefetching is to be executed when a page size is "4" KB and the TLB entry number (n) associated with the tag 52 is "4". In this case, the controlling unit 51 may prefetch a translation table indicative of n TLB entries 531 associated with the virtual address "0x1_0000+0x10000×4"="0x1_4000".

In the example of FIG. 15, the controlling unit 51 may prefetch TLB entries 531 associated with the four physical addresses E-H subsequent to the physical address D.

In the event of prefetching, the controlling unit 51 updates the status 521d of the tag entry 521 of the TLB bit to "prefetching done" (denoted as "Done" in FIG. 15).

As the above, the controlling unit 51 may execute the prefetching if the TLB number of a single TLB 531 specified on the basis of the second virtual address is larger than the TLB number 521c set in the tag entry 521. For example, the controlling unit 51 may obtain information of one or more TLB entries 531 subsequent to one or more TLB entries 531 associated with the hit tag entry 521 from the main memory 3.

After executing prefetching, the controlling unit 51 updates the tag 52 and the TLB 53 on the basis of the translation table (see Arrows C6 and C7) in the same manner as a case where prefetching is executed when a TLB miss occurs.

For example, as illustrated in FIG. 15, the controlling unit 51 registers a tag entry 521 having translation information 521b containing the upper bits common to the four pages of the virtual address associated with the physical addresses E-H. No value is set in the TLB number 521c of the tag entry 521, and the value "new" is set in the status 521d of the same tag entry 521. The tag entry 521 is associated with four TLB entries 531 to be added to the TLB 53. Further, the controlling unit 51 registers four TLB entries 531 associated with the physical addresses E-H into the TLB 53. Either the process of Arrow C4 or the processes of Arrows C5-C7 may be performed earlier or the processes may be at least partially performed in parallel.

If the TLB number indicating the TLB entry 531 obtained in step of Arrow C3 is equal to or smaller than the previously-hit TLB number 521c of the tag entry 521, the controlling unit 51 may suppress execution of the prefetching. In this case, the controlling unit 51 may set (update) the TLB number indicating the TLB entry 531 obtained in step of Arrow C3 in the previously-hit TLB number 521c of the tag entry 521.

As the above, the MMU 5 of the one embodiment can achieve prefetching that can deal with a stride access, omitting HW devices such as an RPT, by storing information used for determination as to whether or not TLB prefetching is to be executed in the tag 52.

The TLB number 521c and the status 521d added to the tag 52 of the one embodiment each have a data size of several bits. Accordingly, the scheme of the one embodiment can suppress an increase in the physical volume of the HW as compared with a configuration additionally including an RPT having a data size of several dozens to hundred bits per entry.

Furthermore, the tag 52 of the one embodiment contains, as the translation information 521*b*, an ID (address space ID) that specifies a process serving as an example of the translation requester. This makes the MMU 5 possible to execute an appropriate translating process for each address space ID even when receiving translation requests for different address spaces from multiple packets sent from multiple translation requesters such as multiple processes or multiple senders.

Figure 16:
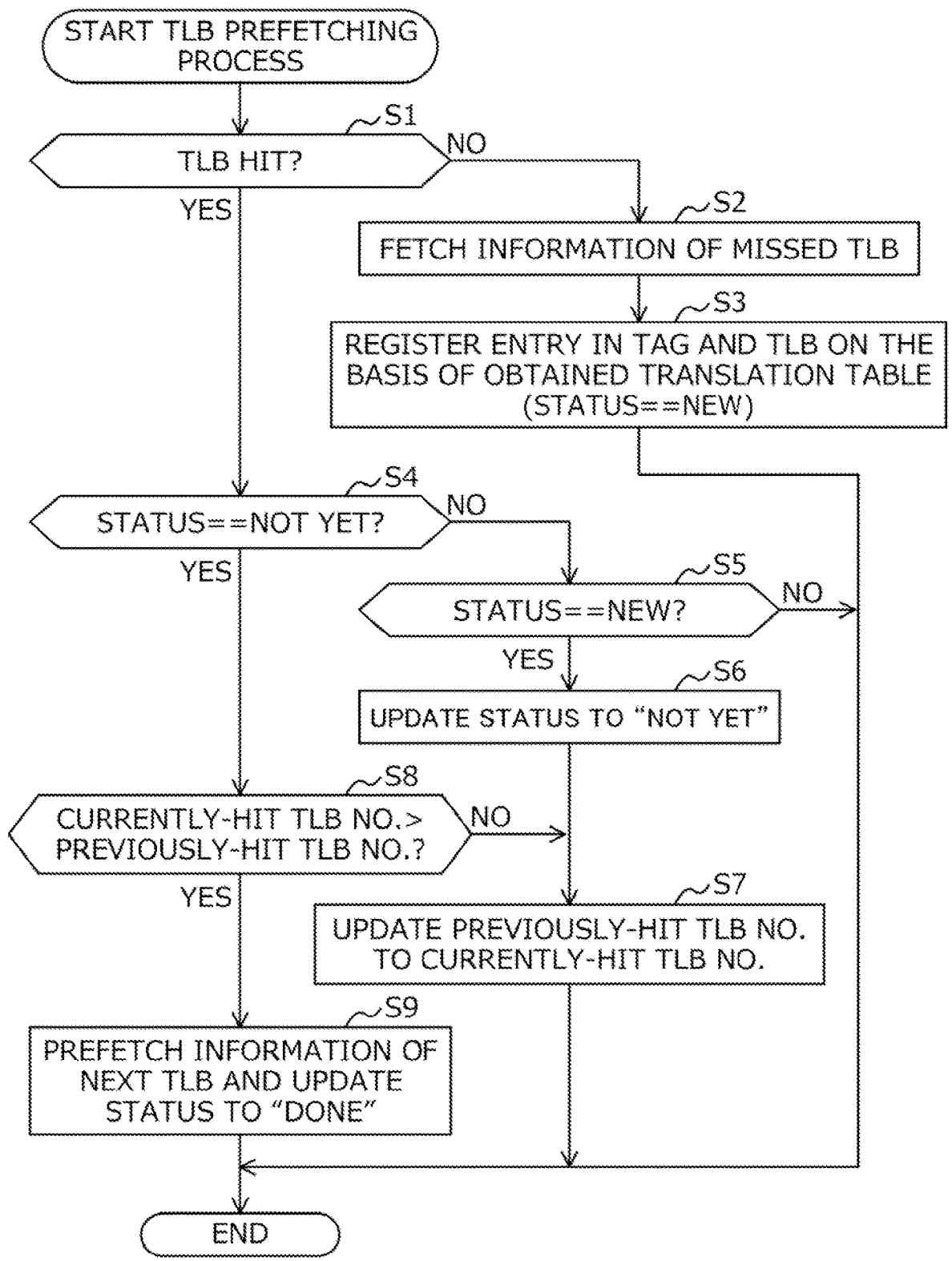
FIG. 16 is a flow diagram illustrating an example of operation of a TLB prefetching process performed by the MMU of the one embodiment.

(1-4) Example of Operation:

Next, description will now be made in relation to an example of operation performed by a computer 1 (MMU 5) according to the one embodiment. FIG. 16 is a flow diagram illustrating an example of operation of a TLB prefetching process performed by the MMU 5 of the one embodiment.

FIG. 16 illustrates an example of operation of an updating process of a tag 52 and a TLB 53 depending on a TLB hit or miss and an determining process as to whether prefetching is to be executed, focusing on a TLB prefetching process in the address translating process performed by the MMU 5. The MMU 5 may execute various processes such as an outputting process (see FIGS. 13-15) of a result of address translation in response to a translation request as well as a TLB prefetching process illustrated in FIG. 16.

As illustrated in FIG. 16, the controlling unit 51 determines whether or not a TLB hit occurs through retrieval of the tag 52, using the translation information contained in the obtained translation request (Step S1).

If a TLB hit does not occur, in other words, a TLB miss occurs (NO in Step S1), the controlling unit 51 fetches information of the missed TLB 53 from the main memory 3 (Step S2). The controlling unit 51 registers the entry into the tag 52 and the TLB 53 (Step S3) on the basis of fetched (obtained) translation table from the main memory 3, and finishes the TLB prefetching process. For example, the controlling unit 51 registers, on the basis of the translation table, a tag entry 521 having the value of the status 521*d* of "new" into the tag 52 and also registers one or more (n) TLB entries 531 associated with the tag entry 521 into the TLB 53 in Step S3.

If a TLB hit occurs (YES in Step S1), the controlling unit 51 determines whether or not the status 521*d* of the hit tag entry 521 is "Not Yet" (i.e., not prefetching yet) (Step S4).

If the status 521*d* is not "Not Yet" (NO in Step S4), the controlling unit 51 determines whether or not the status 521*d* is "new" (Step S5). If the status 521*d* is not "new", in other words, prefetching "Done" (NO in Step S5), the TLB prefetching process finishes.

If the status 521*d* is "new" (YES in Step S5), the current TLB hit is the first TLB hit since the tag entry 521 was registered. In this case, the controlling unit 51 updates the status 521*d* to "Not Yet" (Step S6) and updates the previously-hit TLB number 521*c* to the currently-hit TLB number (Step S7), and then the TLB prefetching process finishes.

If the status 521*d* is "Not Yet" in Step S4 (YES in Step S4), the controlling unit 51 determines whether or not the currently-hit TLB number is larger than the previously-hit TLB number 521*c* of the tag entry 521 (Step S8).

If the currently-hit TLB number is equal to or smaller than the previously-hit TLB number 521*c* of the tag entry 521 (NO in Step S8), the process shifts to Step S7.

If the currently-hit TLB number is larger than the previously-hit TLB number 521*c* of the tag entry 521 (YES in Step S8), the controlling unit 51 prefetches information of the next TLB 53 from the main memory 3. The controlling unit 51 updates the status 521*d* of the tag entry 521 to prefetching "Done" (Step S9), the TLB prefetching process finishes. After obtaining the translation table through prefetching, the controlling unit 51 registers the tag entry 521 and the TLB entry 531 into the tag 52 and the TLB 53, respectively, on the basis of the translation table in the same manner as Step S3.

(2) Miscellaneous

The technique according to the above one embodiment may be changed and modified as follows.

For example, the one embodiment assumes that n="4" and a single tag entry 521 is associated with four TLB entries 531, but is not limited to this. Alternatively, the value "n" may be except for "four".

As one aspect, the embodiment discussed herein can suppress an increase in physical volume of the memory management unit.

Throughout the specification, the indefinite article "a" or "an" does not exclude a plurality.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A memory management unit comprising:
a first storing region that stores one or more first entries indicating a physical address matching a first bit range of a virtual address;
a second storing region that stores a second entry associating the first bit range of the virtual address with the one or more first entries; and
a controller that performs a translating process in response to a translation request containing the virtual address, the translating process translating the virtual address to the physical address based on the first storing region and the second storing region, wherein
the controller
when a second entry matching the first bit range of a first virtual address is hit through retrieving the second storing region in a first translating process performed in response to a first translation request containing the first virtual address, sets, in the hit second entry, an identification number of one of the first entries that is specified by the first virtual address among one or more first entries associated with the hit second entry, and
when the second entry hit in the first translating process is hit through retrieving the second storing region in a second translating process performed in response to a second translation request containing a second virtual address and when an identification number of a first entry specified by the second virtual address is larger than an identification number set in the second entry, obtains information of one or more first entries subsequent to one or more first entries associated with the hit second entry from a memory.

2. The memory management unit according to claim 1, wherein the controller sets, in the first storing region, the one or more first entries subsequent to the one or more first entries associated with the hit second entry based on the information obtained from the memory, and sets a second entry associated with the one or more set first entries in the second storing region.

3. The memory management unit according to claim 1, wherein
when the second entry hit in the first translating process is hit through retrieving the second storing region in the second translating process and when the identification number of the first entry specified by the second virtual address is equal to or less than the identification number set in the second entry, the controller sets an identification number of one first entry specified by the first virtual address in the second entry.

4. The memory management unit according to claim 1, wherein
the translation request includes the virtual address and identification information of an address space assigned to an issuing source of the translation request;
the controller
sets the second entry of the second storing region for each of the identification information; and
retrieves the second storing region with reference to the identification information included in the translation request and the virtual address in the translating process.

5. The memory management unit according to claim 1, wherein
the first bit range is a range of a given number of upper bits of the virtual address; and
the identification number is a value indicated by a range of a given number of bits subsequent to the first bit range in the virtual address.

6. A computer-implemented method for memory management by a controller of a memory management unit, the method comprising:
performing a translating process that performs a translating process in response to a translation request containing the virtual address, the translating process translating the virtual address to a physical address based on a first storing region storing one or more first entries indicating the physical address matching a first bit range of the virtual address and a second storing region storing a second entry associating the first bit range of the virtual address with the one or more first entries,
when a second entry matching the first bit range of a first virtual address is hit through retrieving the second storing region in a first translating process performed in response to a first translation request containing the first virtual address, setting, in the hit second entry, an identification number of one of the first entries that is specified by the first virtual address among one or more first entries associated with the hit second entry, and
when the second entry hit in the first translating process is hit through retrieving the second storing region in a second translating process performed in response to a second translation request containing a second virtual address and when an identification number of a first entry specified by the second virtual address is larger than an identification number set in the second entry, obtaining information of one or more first entries subsequent to one or more first entries associated with the hit second entry from a memory.

7. The computer-implemented method according to claim 6, further comprising:
setting, in the first storing region, the one or more first entries subsequent to the one or more first entries associated with the hit second entry based on the information obtained from the memory, and setting a second entry associated with the one or more set first entries in the second storing region.

8. The computer-implemented method according to claim 6, further comprising
when the second entry hit in the first translating process is hit through retrieving the second storing region in the second translating process and when the identification number of the first entry specified by the second virtual address is equal to or less than the identification number set in the second entry, setting an identification number of one first entry specified by the first virtual address in the second entry.

9. The computer-implemented method according to claim 6, wherein
the translation request includes the virtual address and identification information of an address space assigned to an issuing source of the translation request;
the method further comprises
setting the second entry of the second storing region for each of the identification information; and
retrieving the second storing region with reference to the identification information included in the translation request and the virtual address in the translating process.

10. The computer-implemented method according to claim 6, wherein
the first bit range is a range of a given number of upper bits of the virtual address; and
the identification number is a value indicated by a range of a given number of bits subsequent to the first bit range in the virtual address.

11. An information processing apparatus comprising:
a memory;
a memory management unit that translates a virtual address to a physical address on the memory,
the memory management unit comprising:
a first storing region that stores one or more first entries indicating the physical address matching a first bit range of the virtual address;
a second storing region that stores a second entry associating the first bit range of the virtual address with the one or more first entries; and
a controller that performs a translating process in response to a translation request containing the virtual address, the translating process translating the virtual address to the physical address based on the first storing region and the second storing region, wherein
the controller
when a second entry matching the first bit range of a first virtual address is hit through retrieving the second storing region in a first translating process performed in response to a first translation request containing the first virtual address, sets, in the hit second entry, an identification number of one of the first entries that is specified by the first virtual address among one or more first entries associated with the hit second entry, and
when the second entry hit in the first translating process is hit through retrieving the second storing region in a second translating process performed in response to a second translation request containing a second virtual address and when an identification number of a first entry specified by the second virtual address is larger than an identification number set in the second entry, obtains information of one or more first entries subsequent to one or more first entries associated with the hit second entry from the memory.

12. The information processing apparatus according to claim 11, wherein
the controller sets, in the first storing region, the one or more first entries subsequent to the one or more first entries associated with the hit second entry based on the information obtained from the memory, and sets a second entry associated with the one or more set first entries in the second storing region.

13. The information processing apparatus according to claim 11, wherein
when the second entry hit in the first translating process is hit through retrieving the second storing region in the second translating process and when the identification number of the first entry specified by the second virtual address is equal to or less than the identification number set in the second entry, the controller sets an identification number of one first entry specified by the first virtual address in the second entry.

14. The information processing apparatus according to claim 11, wherein
the translation request includes the virtual address and identification information of an address space assigned to an issuing source of the translation request;
the controller
sets the second entry of the second storing region for each of the identification information, and
retrieves the second storing region with reference to the identification information included in the translation request and the virtual address in the translating process.

15. The information processing apparatus according to claim 11, wherein
the first bit range is a range of a given number of upper bits of the virtual address; and
the identification number is a value indicated by a range of a given number of bits subsequent to the first bit range in the virtual address.

16. The information processing apparatus according to claim 11, further comprising a processor that accesses the memory, wherein
the memory management unit is included in the processor.

17. The information processing apparatus according to claim 11, further comprising a Input-Output (IO) device that accesses the memory, wherein
the memory management unit is included in the IO device.

* * * * *